US008086261B2

(12) United States Patent
Radpour

(10) Patent No.: US 8,086,261 B2
(45) Date of Patent: Dec. 27, 2011

(54) SYSTEM AND METHOD FOR PROVIDING DIGITAL NETWORK ACCESS AND DIGITAL BROADCAST SERVICES USING COMBINED CHANNELS ON A SINGLE PHYSICAL MEDIUM TO THE CUSTOMER PREMISES

(75) Inventor: Assad Radpour, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1512 days.

(21) Appl. No.: 10/960,771

(22) Filed: Oct. 7, 2004

(65) Prior Publication Data

US 2006/0077921 A1 Apr. 13, 2006

(51) Int. Cl.
*H04M 1/00* (2006.01)

(52) U.S. Cl. ...... 455/550.1; 455/3.02; 455/98; 455/427; 725/130

(58) Field of Classification Search ................. 455/3.02, 455/427, 98, 550.1; 725/130
See application file for complete search history.

(56) References Cited

U.S. PATENT DOCUMENTS 4,243,147 A 1/1981 Twitchell et al.
4,356,509 A 10/1982 Skerlos et al.
4,768,926 A 9/1988 Gilbert, Jr.
4,907,079 A 3/1990 Turner et al.
5,126,731 A 6/1992 Cromer, Jr. et al.
5,163,340 A 11/1992 Bender
5,467,384 A * 11/1995 Skinner, Sr. .................. 455/402
5,475,835 A 12/1995 Hickey
5,532,748 A 7/1996 Naimpally
5,541,917 A 7/1996 Farris
5,589,892 A 12/1996 Knee et al.
5,592,477 A 1/1997 Farris et al.
5,610,916 A 3/1997 Kostreski et al.
5,613,012 A 3/1997 Hoffman et al.
5,650,831 A 7/1997 Farwell
5,651,332 A 7/1997 Moore et al.
5,656,898 A 8/1997 Kalina
5,675,390 A 10/1997 Schindler et al.
5,694,138 A * 12/1997 Crosby .......................... 343/704
5,708,961 A 1/1998 Hylton et al.
5,722,041 A 2/1998 Freadman
5,724,106 A 3/1998 Autry et al.
5,729,825 A 3/1998 Kostreski et al.
5,734,853 A 3/1998 Hendricks et al.
5,774,357 A 6/1998 Hoffberg et al.
5,793,438 A 8/1998 Bedard (Continued)

FOREIGN PATENT DOCUMENTS

WO WO 99/63759 A2 12/1999

(Continued)

OTHER PUBLICATIONS

Henry Samueli, The Broadband Revolution, Mar. 2000, IEEE Micro.*

(Continued)

*Primary Examiner* — Vladimir Magloire
(74) *Attorney, Agent, or Firm* — Toler Law Group

(57) ABSTRACT

The disclosure is directed to customer premises equipment including a network access port configured to receive broadband digital network data from broadband wireless network access equipment, a broadcast access port configured to receive digital satellite broadcast data, and a unified access port configured to provide the broadband digital network data and the digital broadcast data via a coaxial cable.

22 Claims, 4 Drawing Sheets

U.S. PATENT DOCUMENTS

| | | | | |
|---|---|---|---|---|
| 5,805,719 | A | 9/1998 | Pare, Jr. et al. | |
| 5,818,438 | A | 10/1998 | Howe et al. | |
| 5,838,384 | A | 11/1998 | Schindler et al. | |
| 5,838,812 | A | 11/1998 | Pare, Jr. et al. | |
| 5,864,757 | A | 1/1999 | Parker | |
| 5,867,223 | A | 2/1999 | Schindler et al. | |
| 5,892,508 | A | 4/1999 | Howe et al. | |
| 5,900,867 | A | 5/1999 | Schindler et al. | |
| 5,910,970 | A | 6/1999 | Lu | |
| 5,933,498 | A | 8/1999 | Schneck et al. | |
| 5,953,318 | A | 9/1999 | Nattkemper et al. | |
| 5,956,024 | A | 9/1999 | Strickland et al. | |
| 5,956,716 | A | 9/1999 | Kenner et al. | |
| 5,970,088 | A | 10/1999 | Chen | |
| 5,987,061 | A | 11/1999 | Chen | |
| 5,990,927 | A | 11/1999 | Hendricks et al. | |
| 5,995,155 | A | 11/1999 | Schindler et al. | |
| 5,999,518 | A | 12/1999 | Nattkemper et al. | |
| 5,999,563 | A | 12/1999 | Polley et al. | |
| 6,002,722 | A | 12/1999 | Wu | |
| 6,005,861 | A | 12/1999 | Humpleman | |
| 6,014,184 | A | 1/2000 | Knee et al. | |
| 6,021,158 | A | 2/2000 | Schurr et al. | |
| 6,021,167 | A | 2/2000 | Wu | |
| 6,028,600 | A | 2/2000 | Rosin et al. | |
| 6,029,045 | A | 2/2000 | Picco et al. | |
| 6,038,251 | A | 3/2000 | Chen | |
| 6,044,107 | A | 3/2000 | Gatherer et al. | |
| 6,052,120 | A | 4/2000 | Nahi et al. | |
| 6,055,268 | A | 4/2000 | Timm et al. | |
| 6,072,483 | A | 6/2000 | Rosin et al. | |
| 6,084,584 | A | 7/2000 | Nahi et al. | |
| 6,111,582 | A | 8/2000 | Jenkins | |
| 6,118,498 | A | 9/2000 | Reitmeier | |
| 6,122,660 | A | 9/2000 | Baransky et al. | |
| 6,124,799 | A | 9/2000 | Parker | |
| 6,137,839 | A | 10/2000 | Mannering et al. | |
| 6,166,734 | A | 12/2000 | Nahi et al. | |
| 6,181,335 | B1 | 1/2001 | Hendricks et al. | |
| 6,192,282 | B1 | 2/2001 | Smith et al. | |
| 6,195,692 | B1 | 2/2001 | Hsu | |
| 6,215,483 | B1 | 4/2001 | Zigmond | |
| 6,237,022 | B1 | 5/2001 | Bruck et al. | |
| 6,243,366 | B1 | 6/2001 | Bradley et al. | |
| 6,252,588 | B1 | 6/2001 | Dawson | |
| 6,252,989 | B1 | 6/2001 | Geisler et al. | |
| 6,260,192 | B1 | 7/2001 | Rosin et al. | |
| 6,269,394 | B1 | 7/2001 | Kenner et al. | |
| 6,275,268 | B1 | 8/2001 | Ellis et al. | |
| 6,275,989 | B1 | 8/2001 | Broadwin et al. | |
| 6,281,813 | B1 | 8/2001 | Vierthaler et al. | |
| 6,286,142 | B1 | 9/2001 | Ehreth | |
| 6,295,057 | B1 | 9/2001 | Rosin et al. | |
| 6,311,214 | B1 | 10/2001 | Rhoads | |
| 6,314,409 | B2 | 11/2001 | Schneck et al. | |
| 6,344,882 | B1 | 2/2002 | Shim et al. | |
| 6,357,043 | B1 | 3/2002 | Ellis et al. | |
| 6,359,636 | B1 | 3/2002 | Schindler et al. | |
| 6,363,149 | B1 | 3/2002 | Candelore | |
| 6,385,693 | B1 | 5/2002 | Gerszberg et al. | |
| 6,396,480 | B1 | 5/2002 | Schindler et al. | |
| 6,396,531 | B1 | 5/2002 | Gerszberg et al. | |
| 6,396,544 | B1 | 5/2002 | Schindler et al. | |
| 6,397,387 | B1 | 5/2002 | Rosin et al. | |
| 6,400,407 | B1 | 6/2002 | Zigmond et al. | |
| 6,411,307 | B1 | 6/2002 | Rosin et al. | |
| 6,442,285 | B2 | 8/2002 | Rhoads et al. | |
| 6,442,549 | B1 | 8/2002 | Schneider | |
| 6,449,601 | B1 | 9/2002 | Friedland et al. | |
| 6,450,407 | B1 | 9/2002 | Freeman et al. | |
| 6,460,075 | B2 | 10/2002 | Krueger et al. | |
| 6,463,585 | B1 | 10/2002 | Hendricks et al. | |
| 6,481,011 | B1 | 11/2002 | Lemmons | |
| 6,486,892 | B1 | 11/2002 | Stern | |
| 6,492,913 | B2 | 12/2002 | Vierthaler et al. | |
| 6,496,983 | B1 | 12/2002 | Schindler et al. | |
| 6,502,242 | B1 | 12/2002 | Howe et al. | |
| 6,505,348 | B1 | 1/2003 | Knowles et al. | |
| 6,510,519 | B2 | 1/2003 | Wasilewski et al. | |
| 6,515,680 | B1 | 2/2003 | Hendricks et al. | |
| 6,516,467 | B1 | 2/2003 | Schindler et al. | |
| 6,519,011 | B1 | 2/2003 | Shendar | |
| 6,522,769 | B1 | 2/2003 | Rhoads et al. | |
| 6,526,577 | B1 | 2/2003 | Knudson et al. | |
| 6,529,949 | B1 | 3/2003 | Getsin et al. | |
| 6,535,590 | B2 | 3/2003 | Tidwell et al. | |
| 6,538,704 | B1 | 3/2003 | Grabb et al. | |
| 6,542,500 | B1 * | 4/2003 | Gerszberg et al. | 370/354 |
| 6,542,740 | B1 | 4/2003 | Olgaard et al. | |
| 6,557,030 | B1 | 4/2003 | Hoang | |
| 6,567,982 | B1 | 5/2003 | Howe et al. | |
| 6,580,391 | B1 | 6/2003 | Kepley et al. | |
| 6,587,873 | B1 | 7/2003 | Nobakht et al. | |
| 6,598,231 | B1 | 7/2003 | Basawapatna et al. | |
| 6,599,199 | B1 | 7/2003 | Hapshie | |
| 6,607,136 | B1 | 8/2003 | Atsmon et al. | |
| 6,609,253 | B1 | 8/2003 | Swix et al. | |
| 6,611,537 | B1 | 8/2003 | Edens et al. | |
| 6,614,987 | B1 | 9/2003 | Ismail et al. | |
| 6,622,148 | B1 | 9/2003 | Noble et al. | |
| 6,622,307 | B1 | 9/2003 | Ho | |
| 6,631,523 | B1 | 10/2003 | Matthews, III et al. | |
| 6,640,239 | B1 * | 10/2003 | Gidwani | 709/203 |
| 6,643,495 | B1 | 11/2003 | Gallery et al. | |
| 6,643,684 | B1 | 11/2003 | Malkin et al. | |
| 6,650,761 | B1 | 11/2003 | Rodriguez et al. | |
| 6,658,568 | B1 | 12/2003 | Ginter et al. | |
| 6,678,215 | B1 | 1/2004 | Treyz et al. | |
| 6,678,733 | B1 | 1/2004 | Brown et al. | |
| 6,690,392 | B1 | 2/2004 | Wugoski | |
| 6,693,236 | B1 | 2/2004 | Gould et al. | |
| 6,701,523 | B1 | 3/2004 | Hancock et al. | |
| 6,704,931 | B1 | 3/2004 | Schaffer et al. | |
| 6,714,264 | B1 | 3/2004 | Kempisty | |
| 6,725,281 | B1 | 4/2004 | Zintel et al. | |
| 6,731,393 | B1 | 5/2004 | Currans et al. | |
| 6,732,179 | B1 | 5/2004 | Brown et al. | |
| 6,745,223 | B1 | 6/2004 | Nobakht et al. | |
| 6,745,392 | B1 | 6/2004 | Basawapatna et al. | |
| 6,747,970 | B1 | 6/2004 | Lamb et al. | |
| 6,754,206 | B1 | 6/2004 | Nattkemper et al. | |
| 6,756,997 | B1 | 6/2004 | Ward, III et al. | |
| 6,760,918 | B2 | 7/2004 | Rodriguez et al. | |
| 6,763,226 | B1 | 7/2004 | McZeal, Jr. | |
| 6,765,557 | B1 | 7/2004 | Segal et al. | |
| 6,766,233 | B2 | 7/2004 | Odinak et al. | |
| 6,766,305 | B1 | 7/2004 | Hoover et al. | |
| 6,769,128 | B1 | 7/2004 | Knee et al. | |
| 6,771,317 | B2 | 8/2004 | Ellis et al. | |
| 6,773,344 | B1 | 8/2004 | Gabai et al. | |
| 6,778,559 | B2 | 8/2004 | Hyakutake | |
| 6,779,004 | B1 | 8/2004 | Zintel | |
| 6,781,518 | B1 | 8/2004 | Hayes et al. | |
| 6,784,804 | B1 | 8/2004 | Hayes et al. | |
| 6,785,716 | B1 | 8/2004 | Nobakht | |
| 6,788,709 | B1 | 9/2004 | Hyakutake | |
| 6,804,824 | B1 | 10/2004 | Potrebic et al. | |
| 6,826,775 | B1 | 11/2004 | Howe et al. | |
| 6,828,993 | B1 | 12/2004 | Hendricks et al. | |
| 6,862,353 | B2 * | 3/2005 | Rabenko et al. | 379/413 |
| 6,909,874 | B2 | 6/2005 | Holtz et al. | |
| 6,938,021 | B2 | 8/2005 | Shear et al. | |
| 7,283,803 | B2 * | 10/2007 | Karaoguz et al. | 455/406 |
| 2001/0011261 | A1 | 8/2001 | Mullen-Schultz | |
| 2001/0016945 | A1 | 8/2001 | Inoue | |
| 2001/0016946 | A1 | 8/2001 | Inoue | |
| 2001/0034664 | A1 | 10/2001 | Brunson | |
| 2001/0044794 | A1 | 11/2001 | Nasr et al. | |
| 2001/0048677 | A1 | 12/2001 | Boys | |
| 2001/0049826 | A1 | 12/2001 | Wilf | |
| 2001/0054008 | A1 | 12/2001 | Miller et al. | |
| 2001/0054009 | A1 | 12/2001 | Miller et al. | |
| 2001/0054067 | A1 | 12/2001 | Miller et al. | |
| 2001/0056350 | A1 | 12/2001 | Calderone et al. | |
| 2002/0001303 | A1 | 1/2002 | Boys | |
| 2002/0001310 | A1 | 1/2002 | Mai et al. | |
| 2002/0002496 | A1 | 1/2002 | Miller et al. | |

2002/0003166 A1 1/2002 Miller et al.
2002/0007307 A1 1/2002 Miller et al.
2002/0007313 A1 1/2002 Mai et al.
2002/0007485 A1 1/2002 Rodriguez et al.
2002/0010639 A1 1/2002 Howey et al.
2002/0010745 A1 1/2002 Schneider
2002/0010935 A1 1/2002 Sitnik
2002/0016736 A1 2/2002 Cannon et al.
2002/0019984 A1 2/2002 Rakib
2002/0022963 A1 2/2002 Miller et al.
2002/0022970 A1 2/2002 Noll et al.
2002/0022992 A1 2/2002 Miller et al.
2002/0022993 A1 2/2002 Miller et al.
2002/0022994 A1 2/2002 Miller et al.
2002/0022995 A1 2/2002 Miller et al.
2002/0023959 A1 2/2002 Miller et al.
2002/0026357 A1 2/2002 Miller et al.
2002/0026358 A1 2/2002 Miller et al.
2002/0026369 A1 2/2002 Miller et al.
2002/0026475 A1 2/2002 Marmor
2002/0029181 A1 3/2002 Miller et al.
2002/0030105 A1 3/2002 Miller et al.
2002/0032603 A1 3/2002 Yeiser
2002/0035404 A1 3/2002 Ficco et al.
2002/0040475 A1 4/2002 Yap et al.
2002/0042915 A1 4/2002 Kubischta et al.
2002/0046093 A1 4/2002 Miller et al.
2002/0049635 A1 4/2002 Mai et al.
2002/0054087 A1 5/2002 Noll et al.
2002/0054750 A1 5/2002 Ficco et al.
2002/0059163 A1 5/2002 Smith
2002/0059425 A1 5/2002 Belfiore et al.
2002/0059599 A1 5/2002 Schein et al.
2002/0065717 A1 5/2002 Miller et al.
2002/0067438 A1 6/2002 Baldock
2002/0069220 A1 6/2002 Tran
2002/0069282 A1 6/2002 Reisman
2002/0069294 A1 6/2002 Herkersdorf et al.
2002/0072970 A1 6/2002 Miller et al.
2002/0078442 A1 6/2002 Reyes et al.
2002/0097261 A1 7/2002 Gottfurcht et al.
2002/0106119 A1 8/2002 Foran et al.
2002/0112239 A1 8/2002 Goldman
2002/0116392 A1 8/2002 McGrath et al.
2002/0124055 A1 9/2002 Reisman
2002/0128061 A1 9/2002 Blanco
2002/0129094 A1 9/2002 Reisman
2002/0133402 A1 9/2002 Faber et al.
2002/0138840 A1 9/2002 Schein et al.
2002/0152264 A1 10/2002 Yamasaki
2002/0169611 A1 11/2002 Guerra et al.
2002/0170063 A1 11/2002 Ansari et al.
2002/0173344 A1 11/2002 Cupps et al.
2002/0188955 A1 12/2002 Thompson et al.
2002/0193997 A1 12/2002 Fitzpatrick et al.
2002/0194601 A1 12/2002 Perkes et al.
2002/0198874 A1 12/2002 Nasr et al.
2003/0005445 A1 1/2003 Schein et al.
2003/0009771 A1 1/2003 Chang
2003/0012365 A1 1/2003 Goodman
2003/0014750 A1 1/2003 Kamen
2003/0018975 A1 1/2003 Stone
2003/0023435 A1 1/2003 Josephson
2003/0023440 A1 1/2003 Chu
2003/0028890 A1 2/2003 Swart et al.
2003/0033416 A1 2/2003 Schwartz
2003/0043915 A1 3/2003 Costa et al.
2003/0046091 A1 3/2003 Arneson et al.
2003/0046689 A1 3/2003 Gaos
2003/0056223 A1 3/2003 Costa et al.
2003/0058277 A1 3/2003 Bowman-Amuah
2003/0061611 A1 3/2003 Pendakur
2003/0071792 A1 4/2003 Safadi
2003/0093793 A1 5/2003 Gutta
2003/0100340 A1 5/2003 Cupps et al.
2003/0110161 A1 6/2003 Schneider
2003/0110503 A1 6/2003 Perkes
2003/0126136 A1 7/2003 Omoigui
2003/0135771 A1 7/2003 Cupps et al.
2003/0141987 A1 7/2003 Hayes
2003/0145321 A1 7/2003 Bates et al.
2003/0149989 A1 8/2003 Hunter et al.
2003/0153353 A1 8/2003 Cupps et al.
2003/0153354 A1 8/2003 Cupps et al.
2003/0159026 A1 8/2003 Cupps et al.
2003/0160830 A1 8/2003 DeGross
2003/0163601 A1 8/2003 Cupps et al.
2003/0163666 A1 8/2003 Cupps et al.
2003/0172380 A1 9/2003 Kikinis
2003/0182237 A1 9/2003 Costa et al.
2003/0182420 A1 9/2003 Jones et al.
2003/0185232 A1 10/2003 Moore et al.
2003/0187641 A1 10/2003 Moore et al.
2003/0187646 A1 10/2003 Smyers et al.
2003/0187800 A1 10/2003 Moore et al.
2003/0189509 A1 10/2003 Hayes et al.
2003/0189589 A1 10/2003 LeBlanc et al.
2003/0194141 A1 10/2003 Kortum et al.
2003/0194142 A1 10/2003 Kortum et al.
2003/0208396 A1 11/2003 Miller et al.
2003/0208758 A1 11/2003 Schein et al.
2003/0226044 A1 12/2003 Cupps et al.
2003/0226145 A1 12/2003 Marsh
2003/0229900 A1 12/2003 Reisman
2004/0003041 A1 1/2004 Moore et al.
2004/0003403 A1 1/2004 Marsh
2004/0006769 A1 1/2004 Ansari et al.
2004/0006772 A1 1/2004 Ansari et al.
2004/0010602 A1 1/2004 Van Vleck et al.
2004/0015997 A1 1/2004 Ansari et al.
2004/0030750 A1 2/2004 Moore et al.
2004/0031058 A1 2/2004 Reisman
2004/0031856 A1 2/2004 Atsmon et al.
2004/0034877 A1 2/2004 Nogues
2004/0049728 A1 3/2004 Langford
2004/0052242 A1 * 3/2004 Laturell ........................ 370/352
2004/0064351 A1 4/2004 Mikurak
2004/0068740 A1 4/2004 Fukuda et al.
2004/0068753 A1 4/2004 Robertson et al.
2004/0070491 A1 4/2004 Huang et al.
2004/0073918 A1 4/2004 Ferman et al.
2004/0098571 A1 5/2004 Falcon
2004/0107125 A1 6/2004 Guheen et al.
2004/0107439 A1 6/2004 Hassell et al.
2004/0111745 A1 6/2004 Schein et al.
2004/0111756 A1 6/2004 Stuckman et al.
2004/0117813 A1 6/2004 Karaoguz et al.
2004/0117824 A1 6/2004 Karaoguz et al.
2004/0128342 A1 7/2004 Maes et al.
2004/0139173 A1 7/2004 Karaoguz et al.
2004/0143600 A1 7/2004 Musgrove et al.
2004/0143652 A1 7/2004 Grannan et al.
2004/0148408 A1 7/2004 Nadarajah
2004/0150676 A1 8/2004 Gottfurcht et al.
2004/0183839 A1 9/2004 Gottfurcht et al.
2004/0194136 A1 9/2004 Finseth et al.
2004/0198386 A1 10/2004 Dupray
2004/0201600 A1 10/2004 Kakivaya et al.
2004/0210633 A1 10/2004 Brown et al.
2004/0210935 A1 10/2004 Schein et al.
2004/0213271 A1 10/2004 Lovy et al.
2004/0221302 A1 11/2004 Ansari et al.
2004/0223485 A1 11/2004 Arellano et al.
2004/0226035 A1 11/2004 Hauser, Jr.
2004/0226045 A1 11/2004 Nadarajah
2004/0239624 A1 12/2004 Ramian
2004/0252119 A1 12/2004 Hunleth et al.
2004/0252120 A1 12/2004 Hunleth et al.
2004/0252769 A1 12/2004 Costa et al.
2004/0252770 A1 12/2004 Costa et al.
2004/0260407 A1 12/2004 Wimsatt
2004/0261116 A1 12/2004 McKeown et al.
2004/0267729 A1 12/2004 Swaminathan et al.
2004/0268393 A1 12/2004 Hunleth et al.
2005/0027851 A1 2/2005 McKeown et al.
2005/0038814 A1 2/2005 Iyengar et al.
2005/0044280 A1 2/2005 Reisman
2005/0055724 A1 * 3/2005 Atad et al. ...................... 725/80

| | | | | |
|---|---|---|---|---|
| 2005/0097612 | A1 | 5/2005 | Pearson et al. | |
| 2005/0132295 | A1 | 6/2005 | Noll et al. | |
| 2005/0195961 | A1 | 9/2005 | Pasquale et al. | |
| 2006/0068777 | A1 * | 3/2006 | Sadowsky et al. | 455/427 |

FOREIGN PATENT DOCUMENTS

| | | | |
|---|---|---|---|
| WO | WO 00/28689 | | 5/2000 |
| WO | WO 01/60066 | A1 | 8/2001 |
| WO | WO 02/17627 | A2 | 2/2002 |
| WO | WO 02/058382 | A1 | 7/2002 |
| WO | WO 03/003710 | A2 | 1/2003 |
| WO | WO 03/025726 | A1 | 3/2003 |
| WO | 03056730 | | 7/2003 |
| WO | WO 2004/018060 | A2 | 3/2004 |
| WO | WO 2004/032514 | A1 | 4/2004 |
| WO | WO 2004/062279 | A1 | 7/2004 |
| WO | 2005025100 | | 3/2005 |
| WO | WO 2005/045554 | A2 | 5/2005 |

OTHER PUBLICATIONS

Kapinos, S., "Accenda Universal Remote Control Tartgets Needs of Elderly, Visually Impaired, Physically Challenged . . . and the Rest of Us" Innotech Systems, Inc., Press Release, Port Jefferson, NY, Dec. 15, 2002.
U.S. Appl. No. 10/752,301, filed Jan. 6, 2004.
U.S. Appl. No. 11/158,926, filed Jun. 22, 2005.
U.S. Appl. No. 10/929,888, filed Aug. 26, 2004.
U.S. Appl. No. 10/915,684, filed Aug. 10, 2004.
U.S. Appl. No. 11/148,967, filed Jun. 9, 2005.
U.S. Appl. No. 10/901,921, filed Jul. 29, 2004.
U.S. Appl. No. 10/915,683, filed Aug. 10, 2004.
U.S. Appl. No. 11/001,676, filed Dec. 1, 2004.
U.S. Appl. No. 10/993,411, filed Nov. 19, 2004.
U.S. Appl. No. 11/179,048, filed Jul. 11, 2005.
U.S. Appl. No. 11/001,683, filed Dec. 1, 2004.
U.S. Appl. No. 11/005,496, filed Dec. 6, 2004.
U.S. Appl. No. 11/049,629, filed Feb. 2, 2005.
U.S. Appl. No. 11/043,443, filed Jan. 26, 2005.
U.S. Appl. No. 11/057,858, filed Feb. 14, 2005.
U.S. Appl. No. 11/064,775, filed Feb. 24, 2005.
U.S. Appl. No. 11/140,616, filed May 27, 2005.
U.S. Appl. No. 11/057,859, filed Feb. 14, 2005.
U.S. Appl. No. 11/093,736, filed Mar. 30, 2005.
U.S. Appl. No. 11/191,154, filed Jul. 27, 2005.
U.S. Appl. No. 11/158,892, filed Jun. 22, 2005.
U.S. Appl. No. 11/106,361, filed Apr. 14, 2005.
U.S. Appl. No. 11/158,927, filed Jun. 22, 2005.
U.S. Appl. No. 10/696,395, filed Oct. 29, 2003.
U.S. Appl. No. 11/077,167, filed Mar. 10, 2005.
U.S. Appl. No. 11/034,223, filed Jan. 12, 2005.
U.S. Appl. No. 11/051,553, filed Feb. 4, 2005.
U.S. Appl. No. 11/046,191, filed Jan. 28, 2005.
U.S. Appl. No. 11/052,006, filed Feb. 4, 2005.
U.S. Appl. No. 11/039,063, filed Jan. 20, 2005.
U.S. Appl. No. 11/037,951, filed Jan. 20, 2005.
U.S. Appl. No. 11/166,785, filed Jun. 24, 2005.
U.S. Appl. No. 11/166,908, filed Jun. 24, 2005.
U.S. Appl. No. 11/166,907, filed Jun. 24, 2005.
International Search Report for International Application No. PCT/US05/34932, mailed on Aug. 11, 2006.
Written Opinion of the International Searching Authority for PCT/US05/34932, mailed on Aug. 11, 2006.
Supplementary European Search Report for Application No. 05802085.0-1246 / 1797674 PCT/US2005034932 dated Feb. 11, 2011; 7 pp.

* cited by examiner

400

SYSTEM AND METHOD FOR PROVIDING DIGITAL NETWORK ACCESS AND DIGITAL BROADCAST SERVICES USING COMBINED CHANNELS ON A SINGLE PHYSICAL MEDIUM TO THE CUSTOMER PREMISES

FIELD OF THE DISCLOSURE

This disclosure, in general, relates to systems and methods for providing digital network access and digital broadcast services.

BACKGROUND

Increasingly, consumers are demanding high quality entertainment services and broadband network access. Consumers are turning to satellite television and cable television for digital broadcast entertainment and are seeking broadband network access, such as through cable modem service or digital subscriber line service. In addition, companies are offering telephone service through digital networks, such as voice-over Internet protocol (VoIP) phones and services.

Cable companies have taken advantage of bandwidth capabilities provided by coaxial cable. As a result, cable companies provide combined services including digital cable television and broadband network access. In addition, cable companies are offering voice-over IP (VoIP) telephone service. As such, cable companies are developing capabilities to provide all three consumer services including television, broadband network access, and telephone services.

As a result, the market has provided a considerable number of devices for broadband network access via coaxial cable. For example, data over cable service interface specification (DOCSIS) modems are available for accessing broadband networks. In addition, televisions and set top boxes are configured to interface with coaxial cable and include cable ready tuners.

Other players in the market have difficulty providing the combination of three services including television, broadband network access, and telephone service. It is difficult for traditional plain old telephone service (POTS) companies to provide broadcast television services via a twisted pair interface to consumers. In addition, it is difficult for Satellite television companies to provide high-speed data network access and telephone service via satellite broadcast systems. As such, an improved system and method for providing combined network access and broadcast services would be desirable.

DETAILED DESCRIPTION OF THE DRAWINGS

Figure 1:
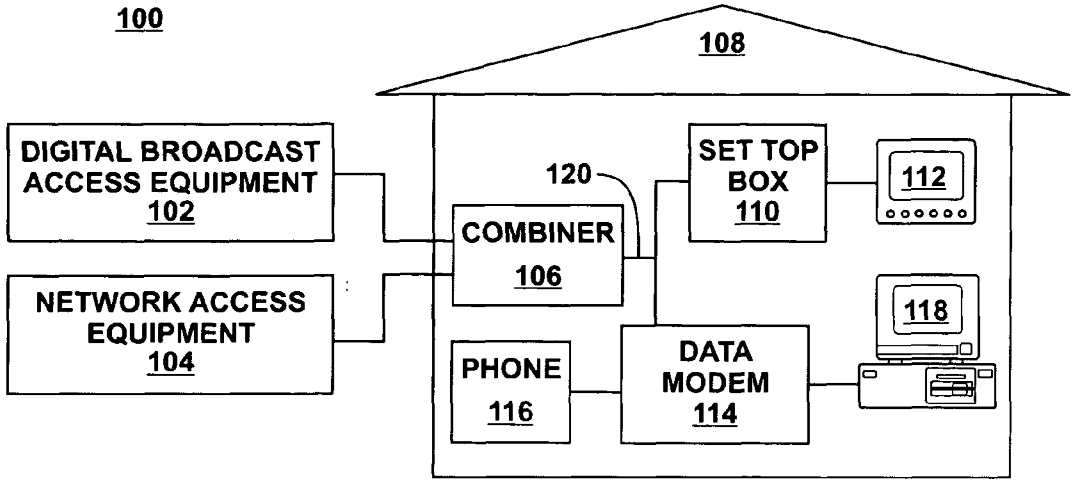
FIGS. 1 and 2 are block diagrams illustrating exemplary systems for providing network access and digital broadcast services.

In a particular embodiment, the disclosure is directed to a system and method for combining digital network access and digital broadcast service. The system includes a services combination unit that has a digital network access port and a digital broadcast services access port. The digital network access port is configured to receive digital network data and the digital broadcast services port is configured to receive digital broadcast data. The services combination unit also includes a combined data access port that is configured to provide the digital network access data and the digital broadcast data. In addition, the combined access port may be configured to receive additional digital network data and the services combination unit may provide the additional digital network data via the digital network access port.

In one exemplary embodiment, the disclosure is directed to customer premises equipment including a network access port configured to receive broadband digital network data from broadband wireless network access equipment, a broadcast access port configured to receive digital satellite broadcast data, and a unified access port configured to provide the broadband digital network data and the digital broadcast data via a coaxial cable.

In another exemplary embodiment, the disclosure is directed to a customer premises system including digital broadcast access equipment located at a customer premises and configured to receive digital broadcast data. The customer premises system also includes data network access equipment located at the customer premises and configured to receive digital network data. The customer premises system further includes a combination unit located at the customer premises and including a network access port configured to receive the digital network data from the network access equipment, a broadcast access port configured to receive the digital broadcast data from the digital broadcast equipment and a unified access port configured to provide the digital network data and the digital broadcast data over a unified link to customer premises equipment.

In a further exemplary embodiment, the disclosure is directed to a method of providing network-based service and digital broadcast service. The method includes receiving digital network data at a customer premises combiner unit via a network access port of the customer premises combiner unit, receiving digital broadcast data at the customer premises combiner unit via a broadcast access port of the customer premises combiner unit, and providing the digital network data and the digital broadcast data via a unified access port of the customer premises combiner unit.

In another exemplary embodiment, the disclosure is directed to a method of providing network-based service and digital broadcast service. The method includes providing a combination unit to be located at a customer premises, providing digital broadcast service via a data line coupled to the combination unit, and providing network access service via the data line coupled to the combination unit.

In a further exemplary embodiment, the disclosure is directed to a method of providing data network access and digital broadcast services. The method includes coupling satellite dish equipment to a broadcast access port of a combination unit located at a customer premises, coupling data network access equipment to a network access port of the combination unit located at a customer premises, and coupling a receiving device to a combined access port of the combination unit located at a customer premises.

FIG. 1 illustrates an exemplary system for combining digital broadcast services and network access services. The system 100 includes digital broadcast access equipment 102 and network access equipment 104. At a customer premises 108, a services combination unit 106 is coupled to the digital broadcast access equipment 102 and the network access equipment 104. The combiner 106 combines data received from the digital broadcast access equipment 102 and the network access equipment 104 into a combined access medium 120, such as a coaxial cable.

Equipment adapted to access the combined access medium 120 can access digital broadcast data received from the digital broadcast access equipment 102 and network data received from the network access equipment 104. For example, a set-top box 110 can access digital broadcast data and provide television signals to a television 112. In another example, a data modem 114, such as a data over cable service interface specification (DOCSIS) modem, can access the network data, such as Internet protocol (IP)-based data or VoIP data, from medium 120 and provide the network data to end devices, such as providing digital telephone service to a digital telephone 116 and Internet service to computer equipment 118.

In one exemplary embodiment, the digital broadcast access equipment 102 is configured to receive digital broadcast data broadcast as electromagnetic signals through the atmosphere, such as microwave equipment or satellite television broadcast equipment. For example, the digital broadcast access equipment 102 can include a satellite dish and low noise block converter (LNB) equipment. The digital broadcast access equipment 102 provides the digital broadcast data, such as video and audio data, to the services combination unit 106.

In another exemplary embodiment, the network access equipment 104 includes wired or wireless forms of network access equipment. For example, the network access equipment may include wired access, such as digital subscriber line (DSL) access. In another exemplary embodiment, the network access equipment 104 may provide wireless network access, such as fixed-point wireless access, ultra-broadband wireless access, WiMax (IEEE 802.16), WiFi (802.11), and WCDMA (3 GPP). For example, the customer premises unit to interface with the network access equipment can include a fixed wireless access antenna and a modem. The network access equipment provides network access data to the service combination unit 106 and can receive network data from the service combination unit 106.

Figure 2:
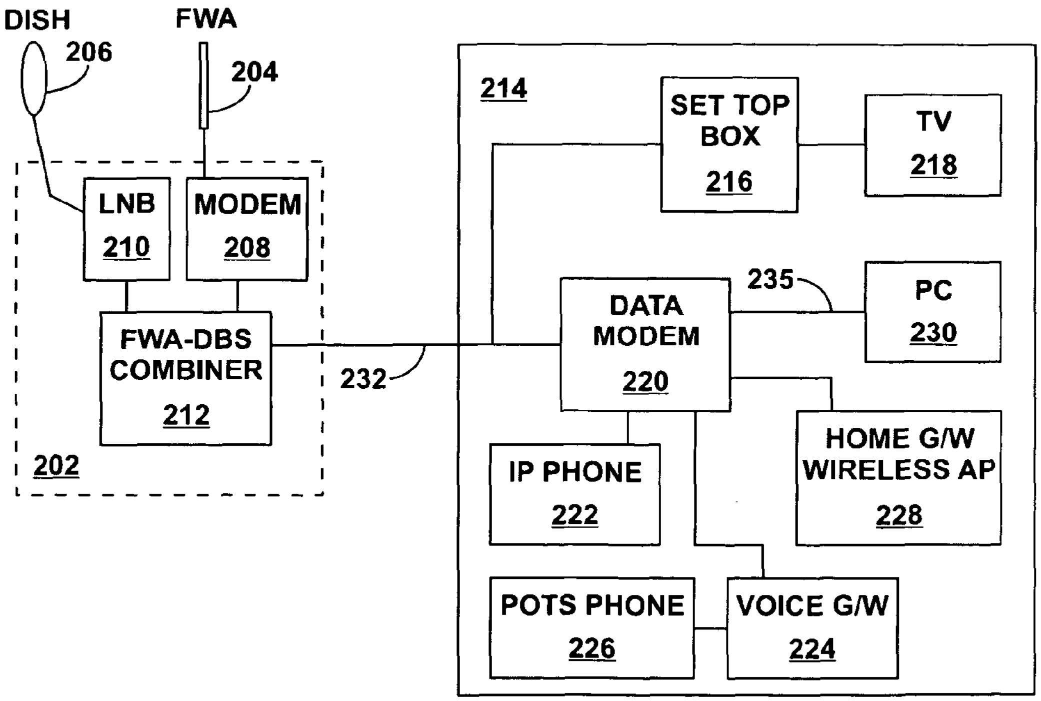

FIG. 2 is a block diagram illustrating an exemplary embodiment of the system for providing combined network access and digital broadcast services. In this exemplary embodiment, a unified receiver unit 202 has a fixed-wireless access antenna 204 and a satellite dish 206. The unified receiver 202 includes a modem 208 and LNB equipment 210. The modem 208 and the LNB equipment 210 are each coupled to a services combination unit 212 that combines the signals from the modem 208 and the LNB 210 into a unified access medium 232, such as a coaxial cable. In one exemplary embodiment, the unified receiver 202 is located at the customer premises 214, such as at a customer home or apartment, within a neighborhood, or near an office building. The unified access medium 232 may be accessed using equipment, such as a set-top box 216 and a data modem 220.

In one particular embodiment, the unified access medium 232 includes a coaxial cable. As a result, equipment adapted to provide services based on coaxial cable interfaces can be used. For example, a set-top box 216 configured to interface with coaxial cable can receive digital broadcast data such as television, video and audio data, from the services combination unit 212 and the unified receiver 220. The set-top box 216 may provide video and audio signals to a representative television 218.

In another exemplary embodiment, the data modem 220, such as a DOCSIS modem, is configured to interface with coaxial cable. Network services may be accessed through the data modem 220, such as Internet service to personal computer 230 through Ethernet cable 235 or through wireless equipment 228, and voice-over IP (VoIP) service to IP-phone 222. In addition, an IAD (integrated services device) or a converter for voice signals 224 may be used to allow plain old telephone service (POTS) telephones 226 to access the network. In one particular embodiment, the wireless access equipment 228, such as BlueTooth® or WiFi equipment, may be used in conjunction with dual-mode portable telephones, such as GSM/WiFi telephones and GSM/BlueTooth® telephones, to provide portable telephones with local wireless access.

In one particular embodiment, the unified receiver 202 is located at a customer premises, such as a customer's home or apartment. For example, a satellite dish 206 and a fixed wireless access antenna 204 are attached to or located near a customer's home. The unified receiver 202 can be located on an outside wall of the customer's home as an attachment to the antennas 204 and 206 and be powered in-line through the access medium 232, which may be a coaxial cable.

Figure 3:
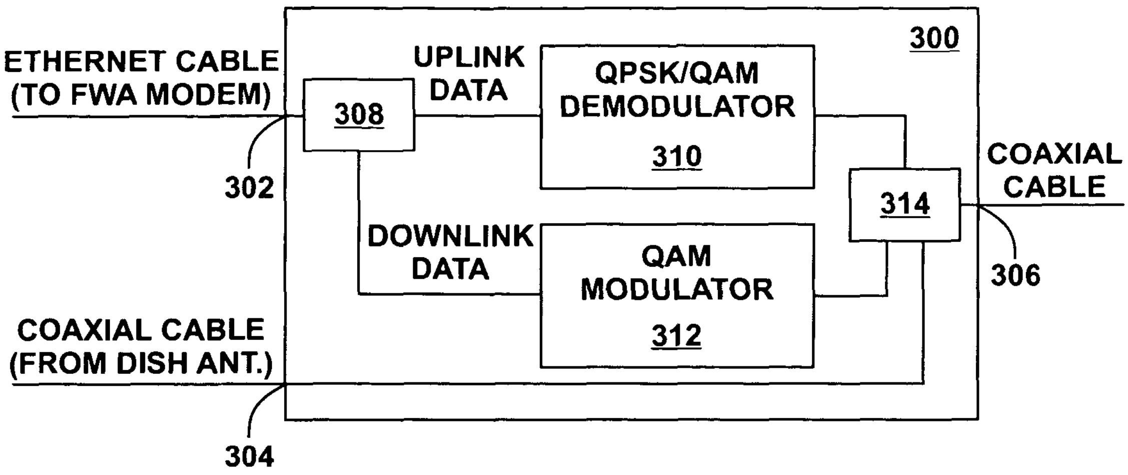
FIG. 3 is a block diagram illustrating an exemplary embodiment of a combination unit for providing services.

FIG. 3 depicts an exemplary services combination unit 300. The services combination unit 300 includes a digital network access port 302 and a broadcast services port 304. The services combination unit 300 may function to combine data received via the network access port 302 and the digital broadcast services port 304 into a unified access port or combined data access port 306, such as a coaxial cable port. In one exemplary embodiment, the broadcast services port 304 includes a coaxial cable port. In another exemplary embodiment, the digital network access port 302 includes an Ethernet port.

The services combination unit 300 may include a quadrature amplitude modulation (QAM) modulator 312 that accesses downlink data associated with the network access port 302 and a quadrature phase shift keying/quadrature amplitude modulation (QPSK/QAM) demodulator 310 that accesses uplink data received via the combined data access port 306 to provide the uplink data to the network access port 302. The QPSK/QAM demodulator 310 and the QAM modulator 312 may be connected to the network data access port 302 by interface 308 and may be connected to the combined data access port 306 via interface 314. In addition, the digital broadcast data port 304 may interface to the combined data access port 306 through interface 314.

In this exemplary embodiment, network data received through network access port 302 may be accessed by QAM modulator 312 through interface 308 and provided to the combined data access port 306 via the interface 314. A data modem or other network accessing equipment may access the network data and provide uplink data through the combined data port 306. The interface 314 allows the QPSK/QAM demodulator 310 to receive the uplink network data from the interface 314 and provide the user data to the network access port 302 via the interface 308. In addition, digital broadcast service data, such as television data, video data and audio data may be provided to the combined data port 306 through interface 314. A set-top box or cable-ready television system may access the combined data access port 306 and receive television signals.

Figure 4:
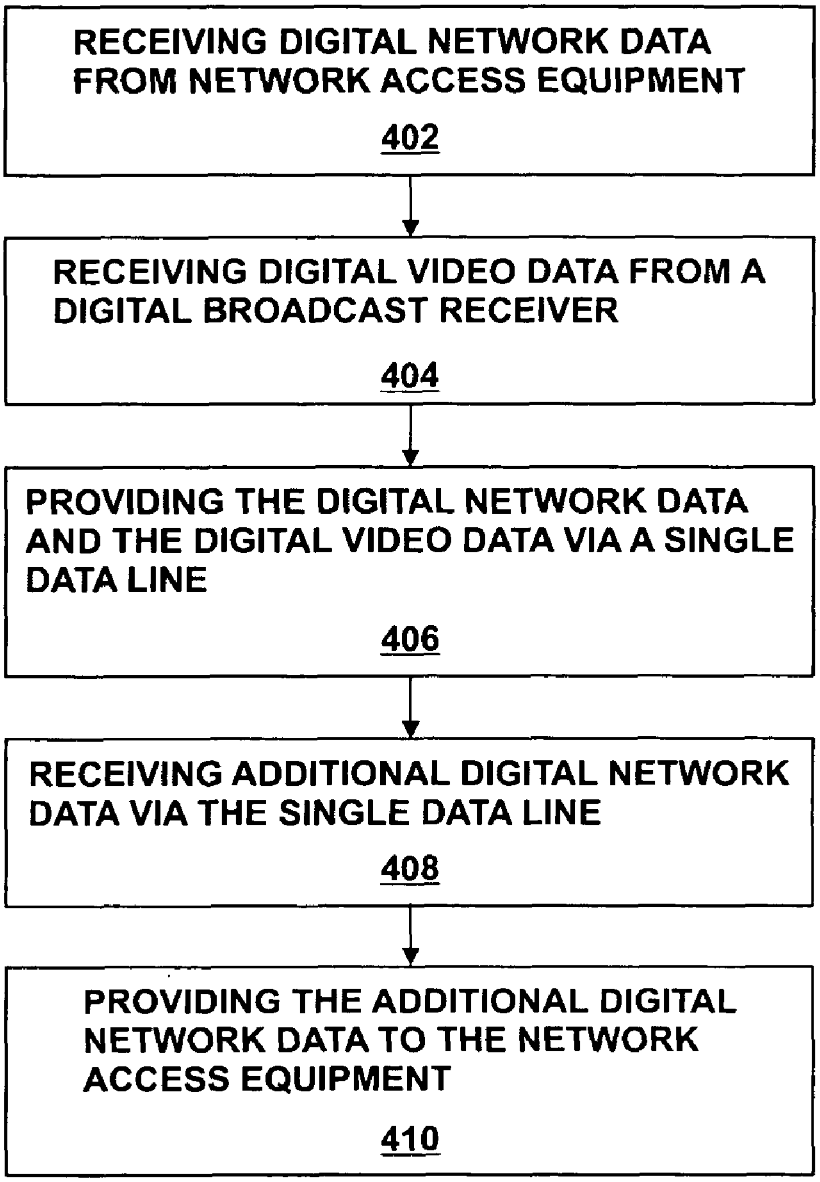
FIGS. 4 and 5 are flow diagrams illustrating exemplary methods for use of the network access and digital broadcast combination unit for providing service.

FIG. 4 is a flow diagram illustrating an exemplary method 400 for using the network data and digital broadcast data services combination unit. The method 400 includes receiving digital network data from the network access equipment, as shown at step 402. Digital broadcast data is received from a digital broadcast receiver, as shown at step 404. The digital network data and the digital broadcast data are provided through a combined data line, as shown at step 406. For example, the digital network data and the digital broadcast data may be combined and provided via a coaxial cable.

In one particular embodiment, network equipment may access the digital network data and communicate additional digital network data through the combined data line. The services combination unit may receive the additional digital network data via the combined data line, as shown at step 408. The services combination unit may provide additional digital network data to the network access equipment, as shown at step 410.

Figure 5:
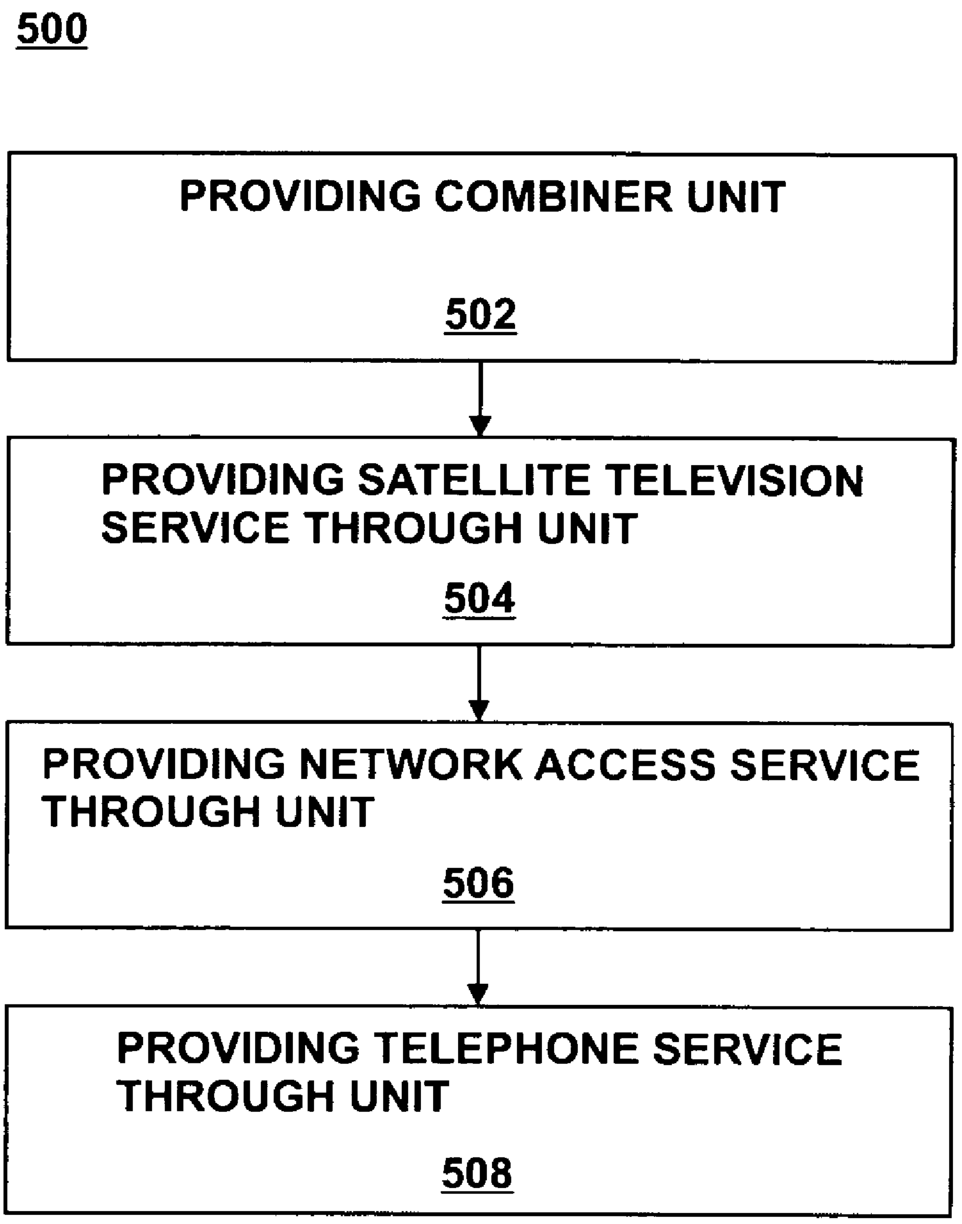

FIG. 5 is a flow diagram illustrating an exemplary method 500 for providing combined data network access and broadcast services. The method 500 includes providing a services combination unit, as shown at step 502. For example, a subscriber to various broadcast entertainment, network access, or telephony services may be provided with a services combination unit or lease the services combination unit. Depending upon the types of services to which a customer subscribes, a set of service equipment may be linked through the services combination unit and the services provided from a single combined data access port on the services combination unit. For example, a service provider may offer satellite television service that is linked through the services combination unit via a coaxial cable, as shown at step 504.

In another exemplary embodiment, a service provider may provide network access services through a services combination unit, as shown at step 506. For example, the network access service may include broadband data network access. In another example, the service provider may provide telephone service through the services combination unit, such as digital or IP-based phone service, as shown at step 508.

In one particular embodiment, a services combination unit may be used to provide voice, data and television service in a low population density area, such as a rural area. Wired cable access is expensive for low population density areas. Wireless service access using the services combination unit may permit use of coaxial cable based equipment in regions where wired cable access is prohibitively expensive.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A customer premises equipment comprising:
- a network access port configured to receive broadband digital network data from a first modem that is coupled to broadband wireless network access equipment;
- a phase-shift keying device coupled to the network access port and configured to phase-shift key the broadband digital network data;
- a broadcast access port configured to receive digital satellite broadcast data;
- a unified access port configured to combine the broadband digital network data and the digital satellite broadcast data for output via a coaxial cable, wherein the customer premises equipment receives power from a customer premises via the coaxial cable, wherein a second digital modem is coupled to the unified access port and is configured to provide network services to one or more devices of a subscriber associated with the customer premises equipment, wherein the network services include at least a first service to enable a plain old telephone service telephone to access a voice network via the second modem.

2. The customer premises equipment of claim 1, further comprising the broadband wireless network access equipment connected to the network access port.

3. The customer premises equipment of claim 2, wherein the broadband wireless network access equipment includes fixed wireless access equipment.

4. The customer premises equipment of claim 1, further comprising a low noise block converter receiver connected to the broadcast access port.

5. The customer premises equipment of claim 4, wherein the low noise block converter receiver is configured to connect to a satellite dish.

6. The customer premises equipment of claim 1, wherein the broadband digital network data includes voice over internet protocol data.

7. The customer premises equipment of claim 1, wherein the broadband digital network data includes internet protocol-based data.

8. A customer premises system comprising:
- digital broadcast access equipment located at a customer premises and configured to receive digital broadcast data;
- data network access equipment located at the customer premises and configured to receive digital network data; and
- a combination unit located at the customer premises, wherein the combination unit includes:
  - a network access port configured to receive the digital network data from a first modem that is coupled to the data network access equipment via an ethernet cable;
  - a broadcast access port configured to receive the digital broadcast data from the digital broadcast access equipment;
  - a unified access port;
  - a phase-shift keying device coupled to the network access port via a first interface and coupled to the unified access port via a second interface, wherein the phase-shift keying device is configured to:
    - receive uplink digital network data from the unified access port via the second interface;
    - provide the uplink digital network data to the network access port via the first interface;
    - receive downlink digital network data from the network access port via the first interface; and
    - provide the downlink digital network data to the unified access port via the second interface,
    - wherein the second interface is further coupled to the broadcast access port and configured to:
      - receive the digital broadcast data from the broadcast access port;
      - combine the downlink digital network data and the digital broadcast data to produce combined digital data; and
      - communicate the combined digital data to the unified access port,
  - wherein the unified access port is configured to:
    - communicate the combined digital data over a coaxial cable to a second modem and to a set-top box device, wherein the second modem is configured to access the downlink network data from the combined digital data and to provide one or more network services, wherein the one or more network services include at least providing a plain old telephone service telephone with access to a voice network via an integrated access device that is coupled to the second modem; and receive uplink digital network data from the second modem via the coaxial cable, wherein the combination unit receives power from the customer premises via the coaxial cable.

9. The customer premises system of claim 8, wherein the data network access equipment includes fixed wireless access equipment.

10. The customer premises system of claim 8, wherein the digital broadcast access equipment includes satellite receiver equipment.

11. The customer premises system of claim 8, wherein the second modem includes a data over cable service interface specification modem.

12. The customer premises system of claim 8, further comprising a voice over internet protocol telephone coupled to the second modem.

13. The customer premises system of claim 8, further comprising a computer coupled to the second modem, wherein the second modem is configured to provide internet access to the computer.

14. The customer premises system of claim 8, further comprising wireless network equipment coupled to the second modem.

15. The customer premises system of claim 8, wherein the set-top box device is configured to connect to television equipment.

16. A method of providing network-based service and digital broadcast service, the method comprising:

receiving digital network data at a customer premises combiner unit from a first modem via a network access port of the customer premises combiner unit, wherein the first modem receives the digital network data from broadband wireless network access equipment;

receiving digital broadcast data at the customer premises combiner unit via a broadcast access port of the customer premises combiner unit;

phase-shift keying at least one of the digital network data and the digital broadcast data;

combining the digital network data and the digital broadcast data for output to a coaxial cable via a unified access port of the customer premises combiner unit, wherein the customer premises combiner unit receives power from a customer premises via the coaxial cable, wherein a second modem is coupled to the unified access port via the coaxial cable and is configured to enable a plain old telephone service telephone to access a voice network via an integrated access device that is coupled to the second modem.

17. The method of claim 16, wherein the digital network data includes internet protocol-based network data.

18. The method of claim 16, wherein the network access port is coupled to the first modem via an ethernet cable.

19. The method of claim 16, wherein the digital network data includes voice-over-internet protocol data.

20. The method of claim 16, wherein receiving digital broadcast data includes receiving digital broadcast data from satellite equipment.

21. The method of claim 16, wherein receiving digital network data includes receiving digital network data at the first modem from fixed wireless access equipment.

22. A customer premises equipment device, comprising:

a low noise block converter to receive digital broadcast data from a satellite dish;

a first modem to receive digital network data via a digital subscriber line, the digital network data including uplink data and downlink data, wherein the modem includes a quadrature amplitude modulation modulator to access the downlink data and includes a quadrature phase shift keying/quadrature amplitude modulation demodulator to access the uplink data; and a combiner unit to:

receive the digital network data from the first modem;

receive digital broadcast data from the low noise block converter; and combine the digital broadcast data and the digital network data for output to a set top box device and to a second modem via a coaxial cable, wherein the customer premises equipment device receives power from a customer premises via the coaxial cable, wherein the set-top box device receives the digital broadcast data via the coaxial cable for presentation at a display device, and wherein the second modem receives the digital network data via the coaxial cable and is configured to:

provide internet access to a personal computing device that is coupled to the second modem;

provide telephony services via a voice over internet protocol phone that is coupled to the second modem;

provide a plain old telephone service telephone access to a voice network via an integrated access device that is coupled to the second modem; and provide local wireless internet access via a wireless access-point that is coupled to the second modem.

* * * * *